April 15, 1958     F. W. MANNING     2,830,404
HORTICULTURAL FABRICS
Original Filed April 26, 1954     2 Sheets-Sheet 1
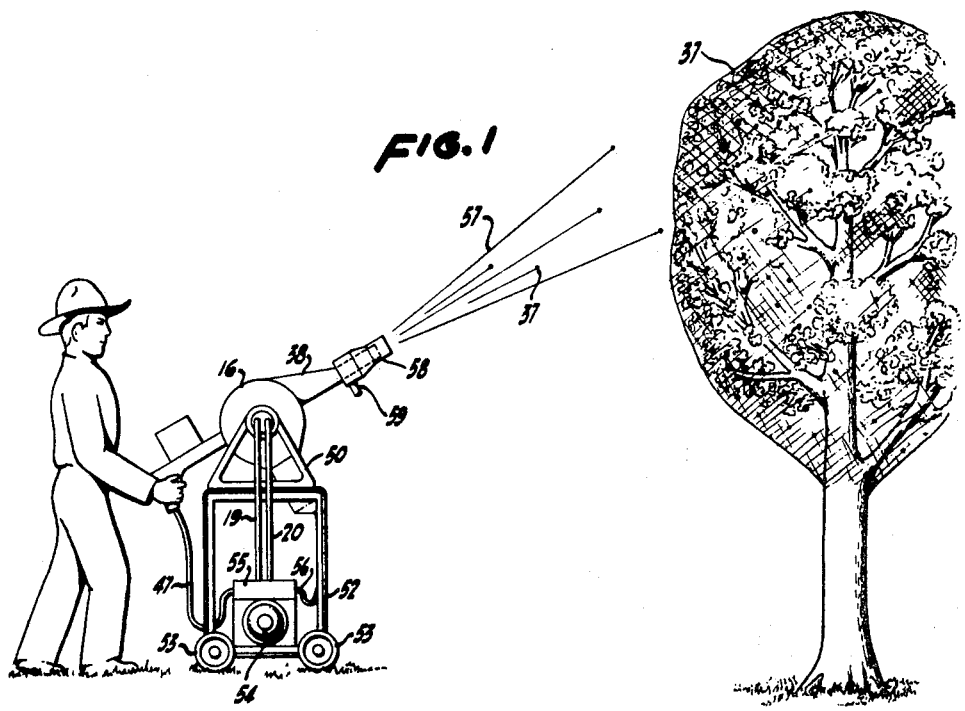
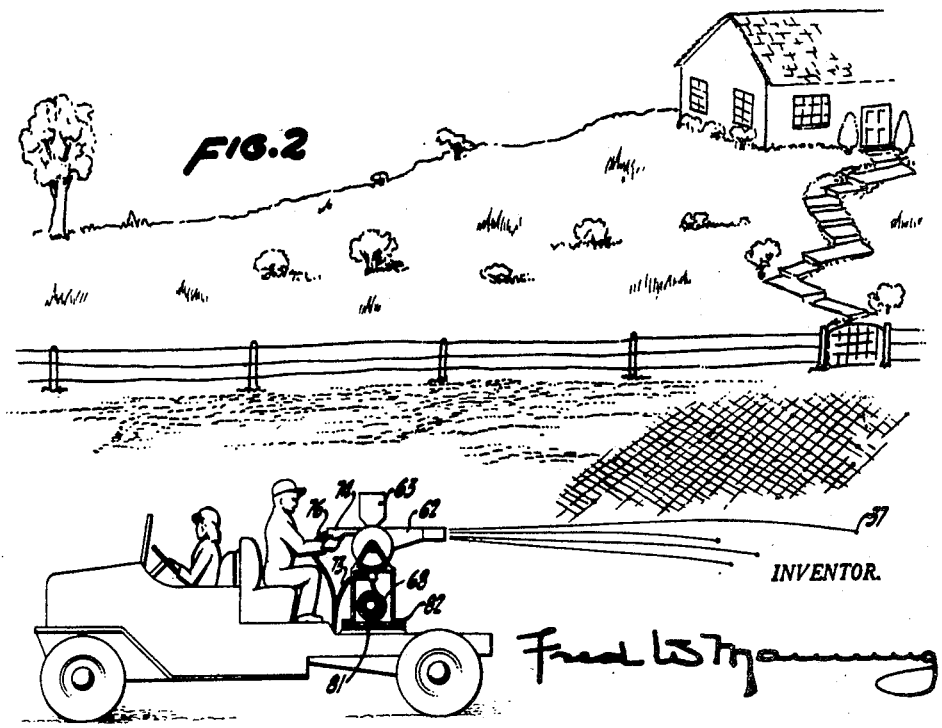
INVENTOR.
Fred W Manning

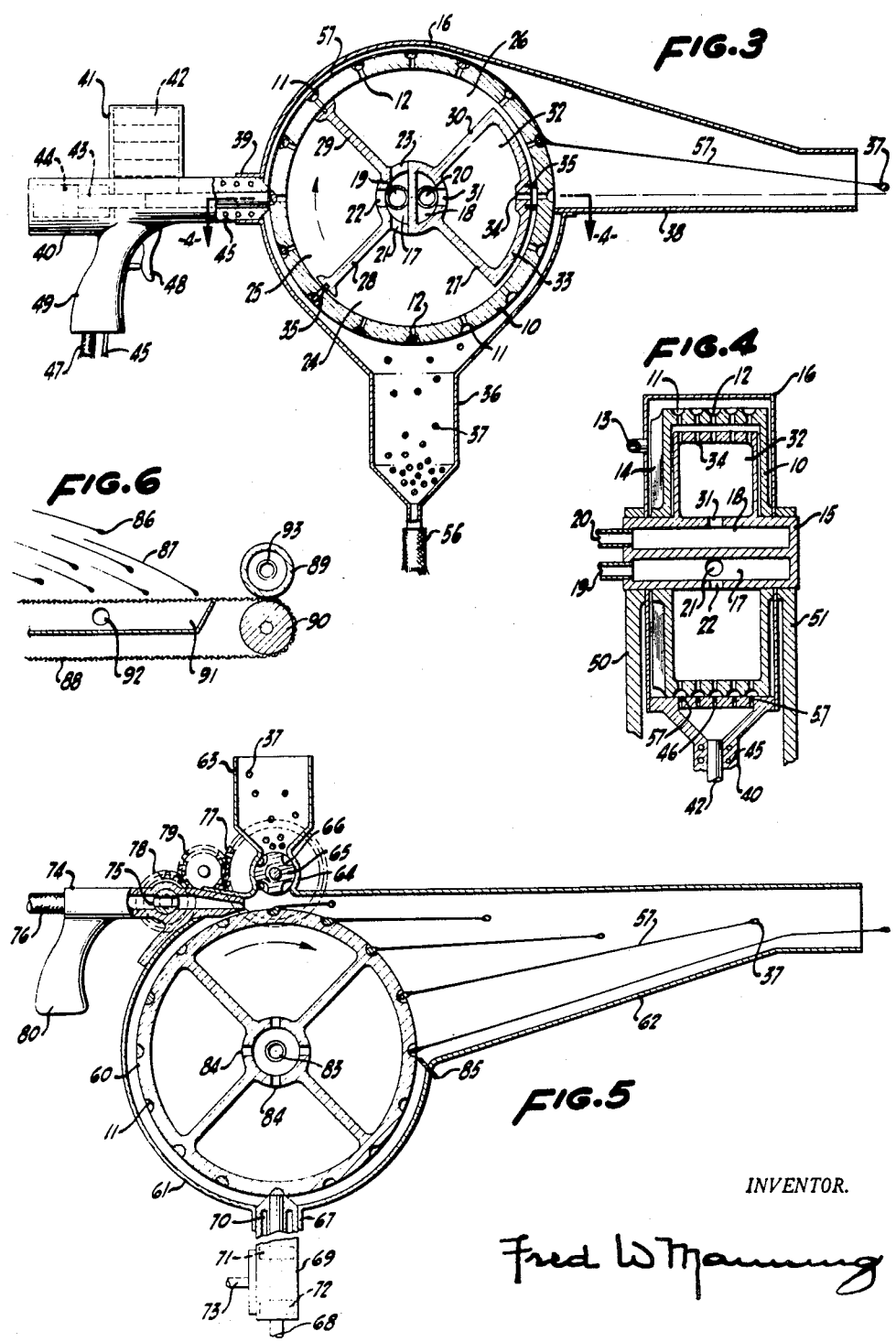

United States Patent Office 2,830,404
Patented Apr. 15, 1958

2,830,404

HORTICULTURAL FABRICS

Fred W. Manning, Palo Alto, Calif.

Original application April 26, 1954, Serial No. 425,374, now Patent No. 2,749,964, dated June 12, 1956. Divided and this application March 16, 1956, Serial No. 571,926

17 Claims. (Cl. 47—1)

My invention relates to horticultural fabrics for the protection of trees, shrubs, flowers, vegetables, grasses, and the like, and also freshly seeded ground. This application is a division of my copending application, Serial No. 425,374, filed April 26, 1954, subsequently issued as Patent No. 2,749,964.

At the present time orchardists sustain substantial losses through the depredations of birds which carry off their fruit crops, such as cherries, almonds, strawberries, etc.; all trees and plants in certain areas suffer from frosts and insects; soil is baked by the sun and eroded by rain and windstorms. To lessen these evils, various devices have been tried—explosion bombs to frighten the birds, smudge pots to raise the temperature, factory-made fabrics that are spread over the ground to serve as mulch. All are expensive and inconvenient.

As distinguished from such prior practice it is a primary object of my invention to spin fabric shelters over trees, plants, freshly seeded ground, etc. at the time and place such coverings are required. To produce filaments of considerable length and throw them substantial distances, the fibre-forming material is attenuated into filaments and the filaments conveyed through the air by the propulsion of adherent solids; and the substantial strength of such filaments is obtained by their molecular stretch-orientation resulting from the pull of the solids.

Another object of my invention is to use pulling solids in the form of pellets produced from soil conditioning materials which are soluble, or will disintegrate in the presence of water, and can be washed from the fabric by rain or shower from a sprinkling system, and which can be used to regulate the acidity or alkalinity of the soil.

A further object is to incorporate seeds for grasses or other plants in the pellets, or adherently contact the seeds to the pellets, so that the ground can be simultaneously seeded at the time the fabric mulch is sprayed over the ground, after which the mulch covered ground may be rolled to partially embed the pellets therein. The seeds will germinate with the disintegration of the pellets but the filaments of the fabric will retain substantial strength until germination has resulted in sufficient growth to prevent erosion from wind and rain. Or the seeds alone can be used as the pulling pellets, providing they are of suitable size and are not injured when contacting and stretching a material reduced to fibre-forming fluidity by thermal or chemical treatment.

An additional object is to protect the seeds during germination from poultry and birds, and also to prevent the escape of moisture from the earth during the said germination. Furthermore, such a covering will maintain a more uniform temperature of the ground until growth has been sufficiently advanced.

A still further object is to coat the interstices of a fabric shelter for plants and trees with an evanescent material that will permit respiration, preferably admit light, can be used for fumigation purposes, and whose life under weathering conditions can be regulated.

In my copending U. S. patent applications, Serial Nos. 185,240; 384,882, and 414,717, filed September 16, 1950; October 8, 1953; March 8, 1954, respectively, subsequently issued as patents, Nos. 2,687,363; 2,750,317; 2,713,001, respectively, I have described how the fibre-forming material and pulling solids can be brought together and filaments produced by means of dual conveying walls moving through endless circuits which converge and diverge in their movements with each other; in the present application, I disclose how the fibre-forming material and pulling solids can be brought into contact on one wall moving through an endless circuit, and filaments produced by propelling the solids from the wall.

Moreover, in the said prior applications, I have described how discrete solids can be deposited on a retaining wall and the wall moved to bring the solids into adherent contact with fibre-forming material; in the present application, I disclose how fibre-forming material can be deposited on a wall and the wall moved to bring the said material into adherent contact with the said solids.

Furthermore, in the said prior applications, I have described how the pulling solids can be bonded by adhesive filaments into an integral fabric; in the present application, I disclose how filaments can be bonded by adhesive solids into an integral fabric.

Some of the most common fibre-forming materials that can be used for the protection of horticultural plant life, or to prevent soil erosion from windstorms are: polyamides, vinylidene chloride, polyethylene, polystyrene, glass, etc., spun from a molten state; cellulose-acetate, polyvinyl-chloride-acetate resins, etc., spun from an acetone or other solution; protein-base materials, petroleum derivatives, etc.

The soil-conditioning pellets are usually produced from various kinds of compost and contain such chemicals as potassium nitrate, phosphate, calcium sulphate, ammonium sulphate, and magnesium sulphate; also trace elements, such as boron, iron sulphate, manganese sulphate, copper sulphate, zinc sulphate, and indole acetic. Or the chemicals alone, if in solid granular form, can be used as the pulling pellets.

All such pellets can be used for pulling and attenuating fibre-forming materials into stretch-oriented filaments; all such solids can be propelled for substantial distances, as from three to twenty-five feet, under a fluid pressure of from 5 to 150 pounds pressure per square inch. Even the much lower pressure produced by an ordinary blowing machine will often be sufficient for my purpose, but this usually depends on the size and weight of the pellets, and the distances they are to be propelled. However, the filaments may be even shorter than indicated above and still have substantial length, such as are produced when the outer end of a comparatively short length enclosure for directing the propulsion of the solids is positioned close to the filament depositing surface, or the solids are propelled by centrifugal action and disintegrated on contact with the wall of the said enclosure.

To obtain and maintain adhesion between a heat-reactive, fibre-forming material and pulling solids until the filaments have reached their maximum stretch, the material may be heated to a fibre-forming fluidity and an adhesive condition prior or subsequent to deposition on a retaining wall; or the solids may be heated sufficiently prior or subsequent to deposition on a retaining wall to render the material adherent on contact; or the material and solids may be brought into contact and the former then heated sufficiently to adhere to the solids. However, if the filaments should become set or nonadherent during attenuation, they can be coated with an adhesive spray, introduced through an ejector on the spinning barrel, so that upon deposition they will be adherent to one another.

A gaseous atmosphere within the spinning chamber may be used to accomplish various purposes. A blast of cold air may be used to set and cold-draw the filaments; steam may be used to maintain the filaments in an adhesive condition until deposited; nitrogen may be used instead of air to prevent oxidation; and the pressure maintained by fluid streams within the chamber may be such that a frangible pulling solid will explode and separate itself from a filament immediately upon discharge from the chamber. All such fluid streams may be used either for propulsion or treating purposes, or both; and they may be introduced adjacent to or through the wall on which the pulling solids have been deposited, or by means of an ejector on the outlet of the stretching chamber. Therefore, by "gaseous atmosphere" within the spinning chamber, I mean an atmosphere therein that is different from normal in temperature, pressure, or composition.

The invention is exemplified in the following description, and preferred arrangements are illustrated by way of examples in the accompanying drawings in which:

Fig. 1 is an elevation view showing the manner in which a fabric may be spun over a tree.

Fig. 2 is an elevation view showing the manner in which a fabric may be spun over freshly cultivated land for seeding and mulch purposes.

Fig. 3 is a vertical section of the spinning apparatus shown in Fig. 1.

Fig. 4 is a cross-section view of the apparatus shown in Fig. 3 taken on line 4—4.

Fig. 5 is a vertical section of the spinning apparatus shown in Fig. 2.

Fig. 6 is a fragmentary vertical section of an apparatus on which the fabric may be deposited for bonding purposes.

Referring to the drawings more specifically by reference characters:

As shown in Figs. 1, 3 and 4, the spinning apparatus consists of an annular rotor wall 10 which is equipped with external pockets 11, and radial openings 12. These may be one or more in number for each pocket, and are smaller than the pockets, and open from the pockets through the wall. The rotor is driven by fluid pressure from a nozzle 13 directed against radial vanes 14 on one side of the rotor.

The rotor turns on the annular shaft 15 which is held in fixed position by the casing enclosure 16. The shaft encloses two internal chambers 17 and 18, having external connections 19 and 20, respectively. The chamber 17 also has ports 21, 22, and 23 to the rotor suction chambers 24, 25 and 26, respectively, which are formed by the shaft arms 27, 28, 29 and 30; and the chamber 18 has a port 31 connected to a pressure chamber 32, which is formed by the two arms 27 and 30 and arc wall 33. In the arc wall are a plurality of radial openings 34 which become in axial alignment with the radial openings 12 in the rotor wall during rotation of the latter. Resilient inserts 35 are placed in the two arms 28 and 29 and arc wall 33 to prevent passage of fluid pressure from the chamber 32 into the other chambers of the rotor. Extensions of the casing enclosure form: a hopper 36 for the pulling pellets 37, a barrel 38 for directing the propulsion of the pellets, and a connection 39 for a device for extruding the fibre-forming material.

The fibre-forming extrusion apparatus is the same as that described in my U. S. patents, Nos. 2,437,264, and 2,522,526, and consists of: a barrel 40, magazine 41 containing the fibre-forming cartridges 42, plunger 43, and piston 44. A cartridge is brought to fibre-forming fluidity by means of an electric circuit 45 and extruded through the fine openings 46 in the extrusion outlet of the barrel, and the extrusion of the fluid material is regulated by air pressure from hose connection 47, controlled by the trigger 48 in the handle 49. The handle also enables the operator to regulate the up-and-down movement of the gun through the left and right hand trunnion bearings 50 and 51, respectively.

These trunnion bearings, as indicated in Fig. 1, are supported on an angle iron table 52, and the latter is moved about on wheels 53. The bottom part of the table supports the motor 54 which drives the air pump 55. The latter is connected by hose pressure lines 47, 56, and 20 to the gun, casing hopper, and rotor pressure chamber, respectively; and the suction of the pump is connected to the rotor suction chambers by hose line 19.

The filaments 57 produced from certain fibre-forming materials will be stretched and propelled in a cold-drawn condition. An ejector 58, having an inlet 59, is therefore provided for the stretching barrel of the rotor casing so that the filaments and pulling solids may be coated with an adhesive when passing therethrough.

In Figs. 2 and 5, the rotor 60 is equipped with circumferential rows of pockets, and its annular axial shaft is rotated in trunnion bearings by means of a fluid jet directed against vanes on the side of the rotor, all similar, except the rotor, to that described above. Extensions of the casing 61 form: a pellet propulsion chamber 62, a hopper chamber 63 for the pulling pellets, a feeding chamber 64 enclosing a rotary pellet feeding device 65 having pockets 66 therein, and a connection 67 to take an extrusion device for feeding fibre-forming material 68 into the said pockets.

The fibre-forming extrusion apparatus is much the same as that described in my U. S. patent, No. 2,437,263, and consists of: a barrel 69, a gas fuel combustion chamber 70 for reducing the said material to fibre-forming fluidity, and pistons 71 and 72 operated by air pressure from hose 73, for feeding the coiled material through the pistons and into the pockets of the rotor as required.

A fluid jet gun 74, equipped with a rotating valve 75, is also attached to the rotor casing so as to direct a blast from hose connection 76 tangentially to the top periphery of the rotor. The arrangement of the gears 77 and 78 on the shafts of the pellet feeding device and fluid blast valve, respectively, with an idler 79 therebetween, is such that the movements of all are synchronized to provide periodic blasts against the pellets as the latter are discharged from the feeding device. Each blast strikes a pellet, or a row of pellets, at the moment the latter makes contact with the fibre-forming material in a pocket, or a row of pockets, of the rotor. The handle 80 is used for raising and lowering the muzzle of the pellet propulsion barrel, and also for rotating the gun and supporting framework in a horizontal plane by means of a turning ring and flange 81 and 82, respectively.

The pump for supplying fluid pressure for the feeding pistons and also the pellet propulsion blasts is geared to the engine drive shaft of the truck, and not shown. The rotor is heated by the combustion of fuel gas within the annular shaft of the rotor, the gas being carried through opening 83 from the carburetor of the engine and openings 84 permitting dispersion of the heat within the rotor. An electrically heated knife 85 is used for severing the stretched filaments from the rotor.

Fig. 6 shows how an independent fabric (not required immediately for protection or seeding purposes) may be produced. Thermoplastic pellets 86 with attached stretch-oriented filaments 87 are deposited on the endless traveling foraminous belt 88 that passes between the top and bottom calender rolls 89 and 90, respectively. Deposition of the pellets and filaments is also aided by maintaining vacuum within the chamber 91 by means of a vacuum pump connected to the outlet 92. The upper roll is steam heated sufficiently from connection 93 to cause the pellets to become adhesive and bond the filaments to one another without causing softening or loss of stretch-orientation to the filaments.

The operation of the apparatus described above has been indicated in part in connection with the foregoing description. The following examples will more completely illustrate the methods that can be used in the practice of my invention.

Example I

Loss of ripened fruit from a cherry tree by the depredations of birds is prevented by spinning polyamide filaments pulled by guano pellets over the tree to form a fabric of very coarse mesh, as shown in Figs. 1, 3 and 4.

Air pressure from the air pump 55 passing through the pellet hopper 36, pockets 11, radial passages 12, port 21, and outlet 19 back to the suction of the pump, results in the pellets 37 rising and filling the pockets 11. The pellets are about ¼ inch in diameter, the pockets about twice the diameter of the pellets, and the radial passages are too small for the pellets to pass therethrough. Consequently, the pellets will be held in the pockets by a differential pressure until blasted therefrom. Cartridges of polyamide fiber-forming material, having a molecular weight of approximately 20,000, are brought to fibre-forming fluidity by heat from the electric circuit 45 and extruded at a temperature of 300° F. from the barrel 40 under pressure of the piston 44 through openings 46 to form threads 57 over and in adherent contact with the pellets on the periphery of the rotor. When necessary, the extrusion outlet can be modified or adjusted to extrude a film coating over the periphery of the rotor, or simply to fill the pockets above the pellets.

The rotor is about 18 inches in diameter, rotates at about 5 to 10 R. P. M. and is coated with a polytetrafluoroethylene resin to prevent sticking of the filaments. As each row of pockets becomes coincident with the passages 34 to the pressure chamber 32, the pellets are blasted from their pockets at an initial velocity of 20,000 feet per minute. This strips the polyamide threads back to the next or second row of pockets in which thread adherent pellets are held in position by suction from outlet 19 through port 23 to the suction chamber 26.

The threads 57, stripped from between the pockets, are cold-drawn into filaments 57 by the pull of the pellets until the elastic limit is reached and the threads part from the said second row of pellets. However, if the original diameter of the threads and their temperature is carefully controlled the pellets can be blasted in a continuous succession from the rotor with little or no breakage of the filaments between the pellets. In any event, the pellets can be propelled with their trailing filaments for substantial distances, as from 3 to 25 feet, and the filaments will also be from 3 to 25 feet in length. The distance that the pellets can be propelled will, of course, depend on the size and weight of the pellets and the force of the blast.

Ordinarily, it will not be necessary to deposit the filaments in an adhesive condition so that they will be bonded to one another upon deposition. However, when such bonding is desirable a water-soluble adhesive, such as starch, alginate, pectin or other suitable adhesive can be used to coat the filaments and solids during propulsion by means of the ejector 58, the adhesive being drawn therein through connection 59 from a container not shown. Or saturated steam at a pressure between 50 and 75 lbs. per square inch can be used for propelling the pellets, and will maintain the filaments in an adhesive condition for ordinary propulsion distances. In such a case the steam would be drawn from a heating unit independent of the pump mentioned above.

The guano pellets will disintegrate and fall to the ground under spray from a garden hose or a shower of rain, or ordinary weathering conditions; and the fertilizing values of the guano will be absorbed by the earth beneath the tree. The filaments, if spun over the tree at a proper time, will disintegrate under weathering conditions about the time the fruit is ready for picking, or it can readily be stripped from the tree at any suitable time, and will also aid in fertilizing the ground thereunder.

Example II

If the spinning of protective fabrics over freshly seeded ground to prevent removal of the seeds by birds, injury from frost, escape of moisture, baking of the earth, and erosion from wind and rains, a polyamide fibre-forming material is used in the truck-conveyed spinning arrangement, as shown in Figs. 2 and 5.

The propulsion solids are formed from leaf mold and readily decompose under weathering conditions. The solids are pelletized by ordinary methods and enclose grass seed, and may contain: herbicides, fungicides, insecticides, etc.; chemicals for adding nutrient to the soil; chemicals for regulating the alkalinity or acidity of the soil; or the pellets themselves may consist of such chemicals in granular form.

Polyamide rod of 3/16 inch in diameter is fed from the supply roll 68 through the dual pistons 71 and 72 and brought to fibre-forming fluidity in the extrusion barrel 69 by the burning of a fuel gas within the combustion chamber 70, and is then extruded under pressure of the dual pistons into pockets 11 of the rotor 60. The fuel is conveyed from the carburetor of the engine to the combustion chamber, and the combustion gases exhausted to the engine exhaust manifold in similar manner to the arrangement often used for the heating of motor vehicles.

The rotor is the same diameter and travels at the same speed as in the previous example, but the pockets are only ⅛ inch in diameter and are completely filled with the fibre-forming material as they pass the extrusion device.

Pulling pellets of 3/16 inch in diameter are fed from the hopper 63 into contact with the filled pockets by means of the feeding rotor 65, and immediately a row of pellets touches the molten polyamide in a corresponding row of pockets, the rotor valve 75 opens and the pellets are blasted from the casing barrel. If the pockets are not exhausted by the time they reach the shearing knife 85, the latter severs the filaments. If the polyamide material is too rigid to be coiled, it may be fed through the pistons in sticks of suitable length, and the extrusion device shifted to a more convenient position on the rotor casing.

Soil to be seeded and conditioned by this method is preferably first cultivated, and after it has been seeded and covered with a fabric mulch it can be rolled to partially embed the pellets in the soil and also to bind the filaments by the pellets. The latter are readily soluble when subjected to a water shower, and the filaments will disintegrate and also enrich the earth after the seeds have germinated and the growth is sufficiently advanced to prevent erosion by wind and rain.

If the freshly seeded ground is to be protected from frost, the filaments should be maintained in an adhesive condition during stretching and coated by cotton, compost, or any convenient short length vegetable fibre, drawn into the propulsion stream by means of an ejector, such as shown in Fig. 1. Or the said vegetable fibre can be used as the pulling solids alone, or in mixture with other soil conditioning materials, and introduced into the hopper 63.

Maintaining the filaments in an adhesive condition is accomplished by keeping the rotor at a temperature of 300° F. by metering a portion of the fuel gas at the engine carburetor and conveying it through a turning joint connected to opening 83 in one end of the hollow shaft of the rotor where it is ignited by means of a spark plug, the exhaust gases escaping through a similar opening in the opposite end of the shaft.

Example III

To protect a tree or other growth from unseasonable temperatures a fabric is spun thereover by the apparatus described in Figs. 3 and 4, as in Example I. However, in this case the spinning is continued until the mesh is sufficiently fine to retain a film-forming solution.

Cellulose acetate in an acetone solvent is then sprayed over the enclosure. The evaporation of the solvent results in a film being formed over the meshes of the fabric which is quite transparent, permits respiration, and yet protects the tree from frost; and under weathering conditions both fabric and film will disintegrate.

However, in order to avoid loss of solvent, it is usually desirable to close the interstices by means of an organic material which can be sprayed at a molten temperature sufficiently below that of the filaments to have no softening effect on the latter, or prejudicial result on the tree enclosed. For example, the softening temperature of the polyamide filaments of the present enclosure is 275° F. Polyethylene can be sprayed from a molten state at a temperature of 225° F. to close the interstices and bind the filaments of the enclosure, and such a temperature will cause no softening of and loss of stretch-orientation to the filaments; nor will it result in injury to the tree for the time of heated contact would be very brief.

Or under incipient freezing conditions the fabric enclosure can also be coated with a fine water spray, and an ice film will close the interstices and bind the filaments of the enclosure, and the latter will afford sufficient protection for the tree.

Obviously either of the first two methods can be used for fumigation purposes; and the third method likewise, providing the fumigating operation does not involve heat.

*Example IV*

To produce factory-made fabric for removal to the location of use, filaments pulled by solid polyethylene pellets are used in the apparatus of Fig. 5, and both filaments and pellets are deposited on the endless foraminous belt of Fig. 6.

Deposition of both filaments and solids is aided by passage of air through the belt into the suction chamber 91 from which it is withdrawn through outlet 92 by means of a suction pump not shown. Both filaments and pellets pass between the calender rolls 89 and 90 where the former roll is maintained at a heat of 225° F. by steam entering through connection 93. This temperature causes the pellets to become softened and adhesive thereby bonding the polyamide filaments into an integral fabric without softening of or loss of stretch-orientation to the filaments.

It is obvious from the above examples that a fibre-forming material can be deposited on a retaining wall in discrete portions, or as a film or threads connected to a source of supply; and the wall can be moved to bring the material into adherent contact with discrete pulling solids that register with discrete portions of the material, or that uniformly contact a film coating or threads of the material. Conversely, the solids can be deposited on a retaining wall in spaced portions or uniformly distributed condition; and the wall can be moved to bring the solids into adherent contact with discrete portions of fibre-forming material that register with the spaced solids, or to bring the solids into contact with a film coating or threads of the material connected to a source of supply.

It is furthermore obvious that fibre-forming materials in a solvent solution, such as cellulose-acetate or a polyvinyl-chloride-acetate resin in an acetone solution, can be extruded onto the periphery of either rotor in threads, in discrete portions, or as a film coating, and filaments produced as described above for thermoplastics brought to fibre-forming fluidity by heat. And it is equally apparent that the soil-conditioning pellets can be extruded by ordinary extrusion apparatus directly into the pockets of the rotor shown in Fig. 3, or in contact with the fibre-forming material in the pockets or on the surface of the rotor shown in Fig. 5.

Irrespective of whether the fibre-forming material is brought to fluidity by heat or solvent, it should remain adhesive or adherent to the pockets or surface of the rotor until the attenuation of the filaments has been completed. To prevent adhesion of filaments to the inside of the stretching barrel and ejector, both may be coated with an antiadhesive. A coating of polytetrafluoroethylene resin will serve for most purposes. If the filaments tend to retract after deposition and the pulling force has been removed, adhesion to or friction with the depositing surface will prevent such retraction until the filaments have become set. Fabrics in which the filaments are bonded to one another and set under tension are always stronger than fabrics in which the filaments are bonded to one another and set under no tension, all other things being equal.

It is also obvious that many other kinds of fabrics can be produced by various modifications of the apparatus just described. As an example, when using suitable high heat resistant materials, such as a Nichrome alloy rotor within a heat refractory enclosure, glass fibre-forming material can be extruded in a molten condition at a temperature between 1800° F. and 2100° F. onto the periphery of either of the rotors shown in Figs. 3 and 5 to contact non-combustible solids. Such solids may be vermiculite, perlite, asbestos, or other inorganic fibres and solids of a higher softening point than the fibre-forming glass material. Fuel gas and air pressure can be used to produce a gaseous blast at a fibre-forming temperature during which the pulling solids may be propelled at an initial velocity of 20,000 feet per minute to produce glass filaments of substantial length and strength. Or if a steam or air blast can be used to propel the solids, the filaments will be chilled before exit from the ejector. In such a case both filaments and solids can be coated with a polyester or other resin from ejector 58 so that on deposition the solids will be bonded by the filaments and the filaments to one another to form a flexible insulating fabric.

It is furthermore obvious that the rotor 10 shown in Fig. 3 may be speeded up sufficiently to give a peripheral speed of 20,000 feet per minute, which is sufficient to throw the pellets through the spinning barrel by centrifugal action and thereby stretch the fibre-forming materials into filaments without the aid of a fluid blast; or a blast from an ejector may be combined with centrifugal force to carry the pellets and filaments when the centrifugal force has been expended.

It will be understood that the word "horticulture," as used throughout the specification and appended claims, means the culture of anything that can be produced from seeds, and also that the word "soil-conditioner" means anything that will improve the soil for the purpose of promoting horticultural growth.

I claim as my invention:

1. An article of manufacture comprising a particle of growth-promoting solid material and a stretch-oriented filament adhering at one end to the said particle.

2. The article of claim 1 in which the said particle is a seed.

3. The article of claim 1 in which the said particle is a seed adherently attached to a solid soil-conditioner, the said conditioner being disintegrative under germination conditions for the said seed.

4. A nonwoven fabric comprising a plurality of discontinuous stretch-oriented filaments extending beyond and intersecting one another in a succession of overlaps, the said filaments being disintegrative when subjected to weathering conditions.

5. The fabric of claim 4 in which the disintegration of the said filaments occurs within a predetermined period of time under the said weathering conditions.

6. The fabric of claim 4 in which the said filaments are bonded to one another by a coating substantially impervious to a gaseous atmosphere.

7. The fabric of claim 6 in which the said coating is an evanescent material.

8. A nonwoven fabric comprising discontinuous stretch-oriented filaments of substantial length extending beyond and intersecting one another in a succession of overlaps and attached to discrete solids in predetermined relation, the said solids being transformative when subjected to horticultural growth conditions.

9. The fabric of claim 8 in which the said attachment is between the termini of the said filaments and the said solids.

10. The fabric of claim 8 in which the said filaments are bonded into an integral fabric by the said solids.

11. The fabric of claim 8 in which the said filaments have interstices thereamong, and including a thin evanescent coating to close the said interstices.

12. The fabric of claim 8 in which the said filaments are thermoplastic and selected from the group consisting of polyamides, vinylidene chloride, polyethylene, polystyrene and glass.

13. A flexible seed distributor comprising the fabric of claim 8 in which the said solids are seeds to be germinated.

14. A flexible seed distributor comprising the fabric of claim 8 in which the said solids are pellets that enclose seeds to be germinated, and the said pellets are disintegrative during the said germination.

15. A flexible seed distributor comprising the fabric of claim 8 in which organic, soil-conditioning material is incorporated in the said fabric.

16. A protective covering for horticultural growth comprising the fabric of claim 8 in which the said solids are water-soluble and soil-conditioning.

17. The covering of claim 16 in which the said filaments are organic and susceptible to disintegration under weathering conditions.

References Cited in the file of this patent

UNITED STATES PATENTS

| | | |
|---|---|---|
| 2,192,939 | Slayter | Mar. 12, 1940 |
| 2,197,929 | Hale | Apr. 23, 1940 |
| 2,338,103 | Fischer | Jan. 4, 1944 |
| 2,601,620 | Marshall | June 24, 1952 |